June 20, 1950          H. C. ADAMS          2,512,127
COMB RAKE
Filed April 22, 1946
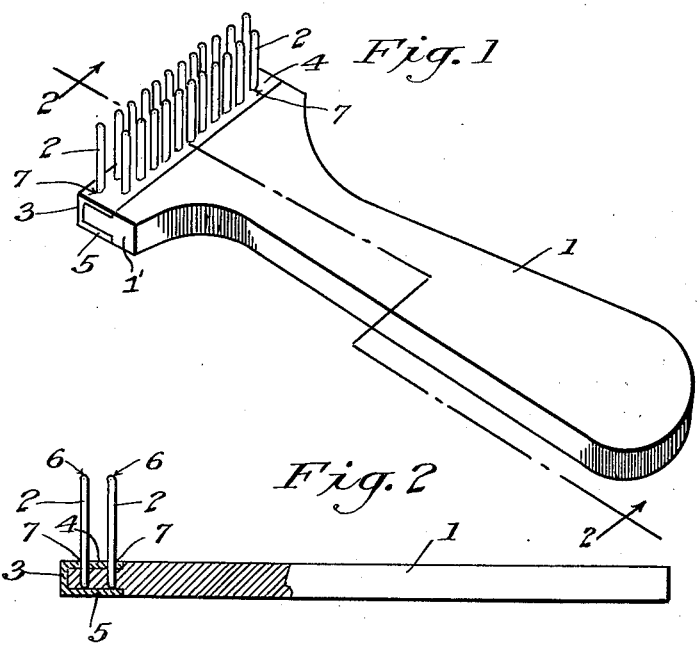
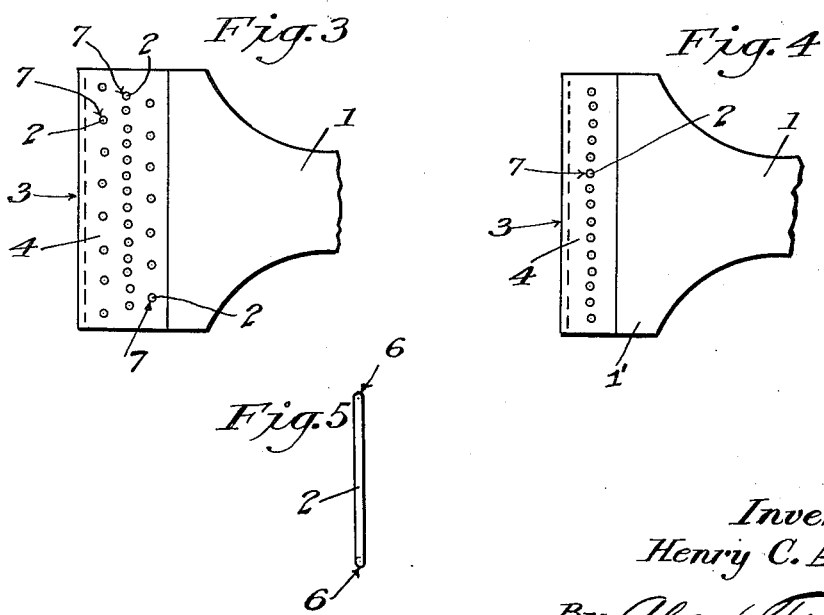
Inventor:
Henry C. Adams,
By Alan Franklin,
his Attorney.

Patented June 20, 1950

2,512,127

UNITED STATES PATENT OFFICE 2,512,127

COMB RAKE

Henry C. Adams, Los Angeles, Calif.

Application April 22, 1946, Serial No. 663,972

4 Claims. (Cl. 119—93)

This invention relates to combs and rakes, and more particularly to a comb rake for combing and raking fur bearing animals, such as dogs, cats, horses and the like.

The general object of the invention is to provide an improved comb rake with rigid teeth or pins which is simple and strong in construction and inexpensive to manufacture.

Other objects and advantages will appear hereinafter as this specification progresses.

The invention is illustrated in the annexed drawing which forms a part of this specification and in which:

Fig. 1 is a perspective of my comb rake.

Fig. 2 is a longitudinal section of my comb rake taken on line 2—2 of Fig. 1.

Fig. 3 is a fragmentary bottom plan view of a modification of my invention.

Fig. 4 is a fragmentary bottom plan view of another modification of my invention.

Fig. 5 is a side view of one of the teeth of my comb rake.

Referring more particularly to the drawing, in which corresponding parts are designated by the same reference numerals in all of the figures, my comb rake comprises a handle 1 formed at one end with a transverse head 1', teeth or pins 2 and a channel base member 3 for supporting and securing said teeth or pins in said head 1' on the forward end of said handle.

The handle 1 is preferably made of wood with flat sides and rounded edges, but it may be made of any other suitable material. The metal channel base member 3 is tightly fitted over the head 1' on forward end of the handle 1 with its lower and upper side walls 4 and 5 countersunk in the lower side and upper side, respectively, of said head. The teeth or pins 2 are rigid and may be made of any suitable material, preferably steel, the ends of which are rounded as indicated at 6. The lower side wall 4 of the channel base member 3 is provided with two rows of holes 7, in staggered relation, extending lengthwise of said channel base member and transversely of the handle head 1', through which holes and 1' are driven said teeth or pins 2 until the inner ends of said teeth or pins strike the other side wall 5 of the channel base member 3 providing two rows of teeth or pins 2 for the comb rake and securing said teeth or pins and the channel base member 3 on the forward end of the head 1', said teeth or pins being of such diameter as to fit tightly in the holes 7, when driven therethrough, whereby said teeth or pins 2 are firmly secured in the channel base member 3.

In operation my comb rake is held by the handle 1, with the teeth or pins 2 extending into the hair of a fur-bearing animal and the rounded outer ends 6 of said teeth or pins engaging the surface of the body of said animal, and the rigid teeth or pins 2 are thus drawn by said handle through the uncombed and matted hair of the animal, whereby said hair is readily untangled and uniformly combed by my comb rake.

In the modification of my invention shown in Fig. 3 there are three rows of holes 7 in the lower side wall 4 of the channel base member 3 through which holes are driven teeth or pins 2 into the head 1' on the forward end of the handle 1, in the manner hereinbefore described, the holes 7 of each row being staggered with relation to the holes 7 of the other two rows, whereby the three rows of teeth or pins 2 are correspondingly staggered, with the teeth or pins 2 of each row out of alignment with the teeth or pins of the other two rows, with relation to the longitudinal axis of the handle 1.

In the modification of my invention shown in Fig. 4 there is only one row of holes 7 in the lower side wall 4 of the channel base member 3, through which holes teeth or pins 2 are driven into the head 1' on the forward end of the handle 1, in the manner hereinbefore described, providing only one row of teeth or pins 2.

The channel base member 3 is made preferably of metal, such as extruded aluminum, which forms a non-warping rigid base for the teeth or pins and reinforces the forward end of the handle 1, while the upper wall 5 of said channel base member engaging the upper ends of the teeth or pins, prevent said teeth or pins from being pushed through the base end of the handle.

I claim:

1. A comb rake comprising a handle formed at its forward end with a head, a base member extending transversely of and secured on said head, pins extending through a portion of said base member and through said head and tightly fitted in said portion of said base member and in said head.

2. A comb rake comprising a handle formed at its forward end with a head, a channel base member fitted over the forward end of said head, pins extending through one side wall of said base member and through said head and tightly fitted in said side wall and said head, with the inner ends of said pins engaging the inner side of the other side wall of said channel base member.

3. A comb rake as claimed in claim 2 in which the side walls of the channel base member are countersunk in the sides of the head.

4. A comb rack as claimed in claim 1 in which the pins are arranged in a plurality of rows extending transversely of the head.

HENRY C. ADAMS.

REFERENCES CITED

The following references are of record in the file of this patent:

UNITED STATES PATENTS

| Number | Name | Date |
|---|---|---|
| 124,991 | Warren | Mar. 26, 1872 |
| 309,668 | Weightman | Dec. 23, 1884 |
| 358,510 | Turner | Mar. 1, 1887 |
| 829,743 | Soule | Aug. 28, 1906 |
| 1,357,069 | Maechler | Oct. 26, 1920 |
| 1,654,105 | Uzmann | Dec. 27, 1927 |
| 2,062,472 | Neuhausen | Dec. 1, 1936 |

FOREIGN PATENTS

| Number | Country | Date |
|---|---|---|
| 580,031 | France | Aug. 19, 1924 |